Sept. 4, 1951 H. L. HORWITZ 2,566,330
METERING ARRANGEMENT FOR TELEPHONE SYSTEMS
Filed June 23, 1945
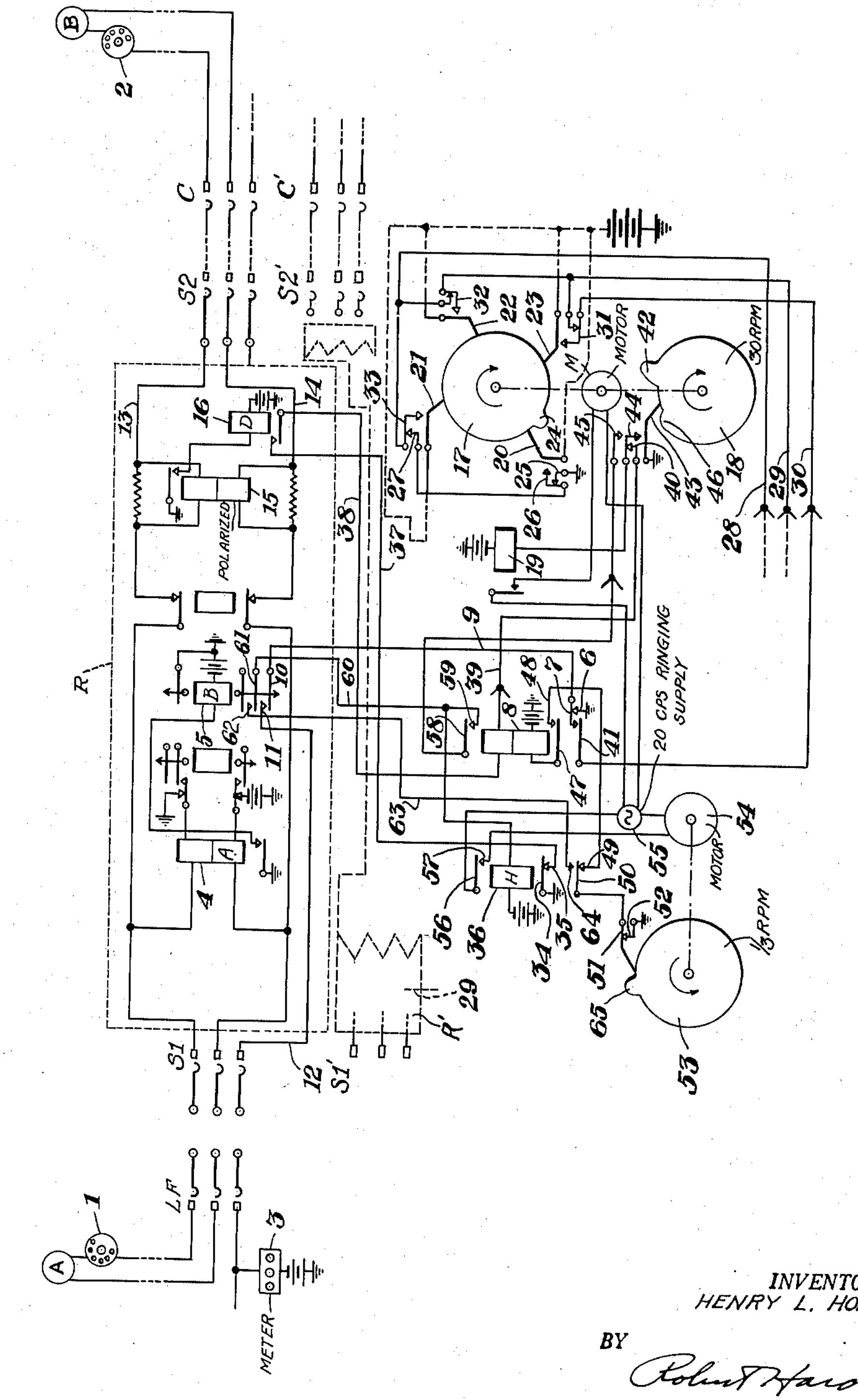
INVENTOR.
HENRY L. HORWITZ
BY Robert Harding Jr.
ATTORNEY Patented Sept. 4, 1951 2,566,330

UNITED STATES PATENT OFFICE 2,566,330

METERING ARRANGEMENT FOR TELEPHONE SYSTEMS

Henry L. Horwitz, Jamaica, N. Y., assignor to Federal Telephone and Radio Corporation, New York, N. Y., a corporation of Delaware Application June 23, 1945, Serial No. 601,096

15 Claims. (Cl. 179—7.1)

This invention relates to telephone exchange systems and more especially to systems designed to provide metered or timed message rate service.

A principal object of the invention is to provide improved mechanisms and circuit arrangements for accurately registering zoned or timed message rate conditions appurtenant to an extended telephone connection.

Another object is to provide an automatic metering or call timing arrangement whereby a calling subscriber may be charged not only in accordance with the distance or zone of the called subscriber's station, but also in accordance with the duration of the conversational connection.

A feature of the invention relates to an improved zone metering arrangement for automatic telephone switching systems.

A further feature relates to an improved zone metering and multiple metering arrangement employing a booster battery control, in conjunction with special impulsing devices which are effective to send multiple booster battery impulses in accordance with the predetermined zoning of a called subscriber's station.

Another feature relates to an improved zone metering controlling device which is common to a number of interoffice or impulse repeating trunks, together with a lock-out mechanism for preventing false starting of the metering control mechanism when it is operatively functioning with a selected repeater trunk.

A still further feature relates to the novel organization, arrangement and relative interconnection of parts which cooperate to provide an improved and accurate zone and multiple metering arrangement.

Other features and advantages not particularly enumerated will be apparent after consideration of the following detailed descriptions and the appended claims.

The single figure of the drawing represents schematically a portion of a typical automatic telephone switching system having an interoffice trunk and impulse repeating arrangement incorporating the invention. Inasmuch as automatic telephone switches and their control circuits are well-known in the art, only those parts of the system are shown in detail in the drawing, as are required for an understanding of the invention. Thus, for example, the drawing represents one of a number of calling subscriber's stations A, and one of a number of called subscriber's stations B. Each of these stations is provided with the usual subscriber's line equipment at the substation and at the respective central office and including the usual control dials 1 and 2.

The station A is also provided with a call metering device 3 of any well-known construction which is connected to the third or private wire individual to station A. Device 3 has a winding which is connected to ordinary forty-eight volt talking voltage battery similar to that which is usually connected to the line cutoff relay. The device 3 does not respond to a direct ground which is applied to the private wire such as is necessary to maintain the line and associated equipment in a busy condition. However, the winding of device 3 is so designed that when a grounded booster battery, for example 100 volts is applied to the private wire, the metering responds. In accordance with the invention, this booster battery is applied in the form of successive impulses of 2, 3, or 4 impulses when the conversational connection has been completed to the called substation B, the number of impulses being dependent upon the particular zone in which the call station is located, the identification of the zone being determined by which one of a group of impulse repeaters is automatically selected for repeating the switching impulses to the called station.

The calling subscriber's line may terminate in the bank contacts of a suitable line finder switch LF, (or line switch) whence the connection can be completed through successive selectors S1, S2 and the final or connector switch C, and through the intermediary of an impulse repeater trunk R, it being assumed that the stations A and B are located in different zones.

The line finder, selector and connector switches may all be of the well-known type such as step-by-step switches, it being understood that the invention is applicable to automatic switching systems generally, regardless of the type of switches used in completing the connections. The circuits and apparatus normally associated with these switches are represented by the dotted line inter-switch connections, and their detailed description is not necessary to an understanding of the present invention. However, for a detailed description of suitable step-by-step selector switches and their usual method of functioning, reference may be had to pages 53–65 inclusive of "Automatic Telephony," second edition, by Smith and Campbell, published in 1921. If power driven switches of the rotary type are employed, reference may be had to the periodical "Electrical Communication" No. 4, vol. II, and Nos. 1 and 2, vol. 12, article entitled "The 7A-2 Rotary Automatic Telephone System" by L. Schreiber and W. Hatton, published in the United States.

In order to explain the invention, it will be assumed that the calling subscriber's station A has been extended in the usual automatic way through switches LF, S1, repeater R and switches S2 and C, to the called station B, and that the said called station is idle. The relays 4 and 5 of repeater R represent generally the usual impulse responsive and impulse guard relays respectively which are well-known in the automatic telephone art. Relay 5 is of the slow-to-release type and remains operated during the extension of the connection to the called station B and until the connection is about to be broken down in the usual way. Relay 5 when operated in response to the seizure of the repeater R by switch S1, closes a circuit from ground at contact 6 and armature 7 of relay 8, conductor 9, armature 10 and contact 11 of relay 5 to the third or private conductor 12 of the trunk, to maintain the busy condition of the trunk in the conventional manner. When the called subscriber answers, the line current is reversed in the well-known manner and causes the operation of polarized relay 15. Relay 15 in turn operates relay 16 over an obvious circuit.

Associated in common with the various repeater trunks is a metering impulse arrangement comprising a motor driven impulsing and cam wheel 17, which is driven at the rate of 30 R. P. M. by a motor M energized by the usual 20 C. P. S. ringing supply current. Motor M also drives another control cam wheel 18 at the same rate. Motor M is not continuously in operation but has its power circuit controlled by a start control relay 19 and the motor is provided with any well-known form of electromagnetic brake (not shown) to prevent overrunning when the power circuit is broken.

Associated with impulser wheel 17 are four contact springs 20, 21, 22, 23. Each of these springs is connected to a common booster battery, e. g. grounded 100 volts, and each spring has associated therewith a make-before-break set. Wheel 17 has a raised projection or cam 24 which is adapted successively to engage the springs 20—23 to operate the respective make-before-break contacts in succession.

The drawing shows impulser 17 in its normal or stand-by position where the cam 24 is ready to engage spring 20 just after the wheel 17 starts to rotate in the direction of the arrow. The break contact 25 is permanently grounded and its associated contact 26 is connected to the break circuit 27 of the second contact set, and likewise for the remaining contacts of the third and fourth contact sets. In other words, in the stand-by position of wheel 17 the ground at contact 25 is extended through the contact sets respectively to the multipled conductors 28, 29 and 30. However, this ground connection has no effect on the operation of the meter 3.

Certain of the repeaters, such as repeater R, have their common metering impulse conductors such as conductor 30, connected in multiple to contact 31. Other repeaters have their common metering impulse conductors such as conductor 29 of repeater R' which is indicated by a dotted enclosure extending from switch S1' to switches S2' and C' and which in all respects may be identical with repeater R, connected in multiple to contact 32, while other repeaters (not shown) have their common impulsing conductor 28 connected to contact 33. Thus depending upon the particular group in which the seized repeater such as repeater R is located, and therefore depending upon the zone of the called line, 2, 3 or 4 metering impulses in the form of booster battery impulses, can be sent out over the appropriate impulsing conductor. In the particular example shown, repeater R is associated with conductor 30 which delivers four successive metering impulses of booster battery to the private wire 12 leading to meter 3.

When relay 16 operates as above described, it closes a circuit from ground at the armature 34 and back contact 35 of relay 36, over conductor 37, front contact and armature of relay 16, conductor 38, operating winding of relay 8, conductor 39, break contact 40 of the spring contact set controlled by wheel 18, thence through motor start control relay 19 which operates and closes the circuit of motor M. As shown, the start relay 19 is common to all repeaters with conductors multipled to conductor 39.

When relay 8 operates, it disconnects the direct ground at armature 7, from the release wire 12 which however is first connected through the make-before-break contact 41 to the common metering impulse conductor 30, which, as above described, is grounded through the chain contacts 31, 32, 33, 27, 26 and 25.

Relay 8, when operated, also prepares but does not complete, the operating circuit of relay 36. This operating circuit is not completed until cam 42 engages contact spring 43 to cause contact 44 to close on contact 45. It should be noted that cam 42 does not effect this double transfer until near the end of each revolution of wheel 18. However, just after wheel 18 starts to rotate, shoulder 46 engages spring 43, causing it to close with contact 44 and then to break the contact between 40 and 44. It should also be observed that the throw of shoulder 46 is insufficient to close 44 and 45.

Another result of the operation of relay 8 is the closure of a holding circuit for that relay traceable from battery through its lower winding, armature 47, contact 48, contact 49 and armature 50 of relay 36, which is still normal, to ground at the normally closed contacts 51, 52, which are controlled by a timing cam 53. Cam 53 is driven at the rate of one-third R. P. M. by a motor 54 which derives its power from the 20 cycle ringing current supply 55. Cam 53 is preferably provided with an automatic reset to restore it to its normal position as shown in the drawing at each revolution. However, the circuit for motor 54 is controlled by the normally open contacts 56, 57, of relay 36.

When motor M starts to rotate under control of relay 19 as above described, the member 24 successively engages the springs 20 to 23 to replace the direct ground from contact 25 with a grounded booster battery (not shown) which is connected to springs 20 to 23. The number of booster battery impulses sent over conductor 12 to the calling subscriber's meter 3 depends upon the particular one of the common impulsing leads 28, 29, 30, to which the contact 41 of relay 8 is connected. In the particular example illustrated, the relay 8 of auxiliary group R has its contact 41 connected to the common metering conductor 30 which is connected to the fourth contact set associated with wheel 17.

Consequently, during one complete rotation of member 17, four successive booster battery impulses are applied to conductor 30, thence through contacts 41 and 7, over conductor 9, contacts 10, 11, conductor 12, thence via switches S1 and LF to grounded forty-eight volt battery through the winding of register 3. As each impulse of booster battery is applied over this last traced circuit, the meter 3 operates to record the number of impulses and therefore the zone corresponding to the called line location.

Immediately after motor M has started to rotate, and before cam 24 has passed the first contact spring 20, the control wheel 18 has by means of shoulder 46 operated its associated contact set, whereby the original operating circuit for the start relay 19 via contacts 34, 35, is broken, but not until the winding of the start relay 19 is directly grounded through contacts 43 and 44. This maintains the start relay 19 continuously operated during the whole metering period. At the same time, all other repeaters in the same group as repeater R are disconnected, since the circuits of the start windings of all the other relays 8 of this group is open at contact 40 during the entire metering period.

After the metering impulse wheel 17 has operated all four springs 20 to 23, but before wheel 18 has returned to stand-by or normal position, the member 42 causes contacts 43, 44 momentarily to close on contact 45, thus completing an operating circuit for relay 36 traceable from ground through contacts 43, 44, 45, contacts 58, 59 of relay 8 to battery through the winding of relay 36. A locking circuit is then traceable through relay 36 over conductor 60, contacts 61 and 62 of relay 5, conductor 63, contacts 64 and 50 of relay 36 to ground through contacts 51 and 52. As soon as relay 36 operates, it breaks the previously described locking circuit for relay 8 which thereupon releases. At the same time, ground at contatcs 34 and 35 is removed from the common start conductor 39, thus preventing undesired reoperation of relay 8 when the common wire 39 is subsequently reconnected to start relay 19 at contact 40. When relay 8 releases, it connects direct ground via contacts 6 and 7, conductor 9, contacts 10 and 11 to the release control conductor 12, and also disconnects the common booster battery impulsing conductor 30. At the end of the metering cycle, the wheel 18 allows the spring 43 to disengage the contact 44 thus disconnecting direct ground from the start control relay 19 and reconnects the common start wire 39 to said relay. If no relay corresponding to relay 16 of any other repeater in this same group is operated to start a new metering cycle, the motor M stops.

In the event that multiple metering is required, it is necessary to repeat the metering cycle after a timed interval. This timed interval is controlled by motor 54 and cam wheel 53. It will be noted that after completion of the normal metering period above described, relay 36 remains locked under control of contacts 51 and 52, and at the same time that relay 36 operates, the power circuit for motor 54 is closed. At the end of a predetermined timed interval, the cam 65 disengages contacts 51 and 52 thereby breaking the locking circuit for relay 36. The release of relay 36 breaks the previously described power circuit for motor 54 and the cam wheel 53 automatically resets to stand-by position.

The above-described operating circuit for relay 8 is thereupon again completed through contacts 34, 35, contacts of relay 16, conductor 38, winding of relay 8 to the common start conductor 39. Relay 8 thereupon operates and starts another metering cycle as described above. This multiple metering operation is repeated until either the calling subscriber or the called subscriber disconnects. In that event, relay 16 releases and disconnects the start winding of relay 8, whereupon the locking circuit for relay 36 is broken at contacts 61 and 62 of relay 5 and relay 36 thereupon releases.

It will be understood of course that while the drawing shows an impulse wheel 17 with four sets of impulser control contacts, a greater or less number may be provided depending upon the number of booster battery metering impulses that are to be delivered during each metering cycle for each seized repeater. It will also be noted that the zone metering control is not effective until the called subscriber answers.

Various changes and modifications may be made in the disclosed embodiment without departing from the spirit and scope of the invention.

What is claimed is:

1. In a telephone system, a calling line, called lines of different tariff rates, a call meter for said calling line, a plurality of trunks for extending the calling line to a desired called line, automatic means to seize one of said trunks under control of the calling line, means including a motor driven switching device for sending a series of operating impulses to said meter corresponding in number and characteristic to the zone in which a particular called line is located, said device being common to said trunks, means responsive to the seizure of one of said trunks to start said motor in rotation, and means to stop said motor after it has caused transmission of a series of impulses corresponding in number to the particular tariff rate of the seized trunk.

2. In a telephone system, a calling line, called lines of different tariff rates, a tariff meter for the calling line, a plurality of trunks for extending the calling line to any desired one of said called lines, means including a motor for transmitting control impulses to said meter, said motor being common to said trunks, a start relay for controlling said motor said relay being common to said trunks, means effective upon the seizure of one of said trunks and responsive to the answer-back condition of the called line to operate said start relay to start said motor, and means controlled by said motor for locking out said start relay from other trunks.

3. In a telephone system, a calling line, called lines of different tariff rates, a tariff meter for the calling line, a plurality of trunks for extending the calling line to any desired one of the called lines, a motor driven switching device, a single series of contact sets successively operated during each rotation of said device to apply successive metering impulses to said trunk and thereby to said meter, means connecting certain of said trunks to less than all of said contact sets, means connecting other trunks to all contact sets, each of said connecting means being correlated with the tariff rates of called lines so as to deliver to the trunk to which the called line is connected a predetermined number of successive metering impulses corresponding in number to the number of contact sets connected to said trunk.

4. In a telephone system, a calling line, called lines located in different tariff zones, a tariff meter for the calling line, a plurality of trunks for extending the calling line to any desired one of the called lines, a motor driven controller common to said trunks, a start relay for said controller common to said trunks, an impulse producing means including a plurality of impulse transmitting contact sets operatively connected to said controller, said controller being adapted to operate said contact sets during each revolution thereof, said contact sets being selectively connected to said tariff meter in accordance with the zone of the called line to transmit to said meter impulses characteristic of such zone.

5. In a telephone system, a calling line, called lines located in different tariff zones, a tariff meter for the calling line, automatic means including trunks for extending the calling line to any desired one of the called lines, means including a single rotary controller common to said trunks for transmitting during a single revolution of said controller a series of metering impulses over a seized trunk to said meter the number of impulses in the series being determined by the character of the zone of the called line to which the seized trunk is connected, and means to produce additional revolutions of said single rotary controller, to repeat said series of impulses in accordance with the duration of the conversational connection between the calling and called lines.

6. A telephone system according to claim 5 in which the last-mentioned means includes a rotating cam which is set into operation at regular timed intervals to produce such additional revolutions.

7. In a telephone system, trunks for extending a calling line to called lines located in different tariff zones, a tariff meter for the calling line, a controller common to said trunks, motor means for rotating said controller through a complete cycle, a source of potential, a plurality of serially connected, impulse transmitting contacts successively engaged by said controller so that during a cycle of rotation of said controller each contact has applied thereto from said source of potential a different number of metering impulses as compared with the remaining contacts, means for multipling certain trunks to certain ones of said contacts, a common start control circuit for said motor means, and means responsive to the establishment of a conversational connection over one of said trunks to the called line to close said start circuit.

8. A telephone system according to claim 7 in which said start control circuit also includes another relay, and means operated by said last-named relay to maintain said motor means energized until said conversational connection is terminated.

9. In a telephone system, trunks for extending a calling line to called lines located in different tariff zones, automatic switches controlled from the calling for seizing one of said trunks, said calling line having talking conductors and a busying conductor, a tariff meter connected to said busying conductor but normally irresponsive to busying potential, said trunk also having a busying conductor to which the calling line busying conductor is extended, means common to said trunks to develop booster battery impulses for operating said meter, the last-mentioned means comprising a rotating cam, a plurality of sets of switch contacts mounted so as to be successively engaged by said cam, each set of switch contacts including a contact connected to booster battery and normally disengaged from the remaining contacts of the set, each set also including a pair of normally closed contacts, means connecting said normally closed contacts of the sets in series with ground, each pair of normally closed contacts having one of its contacts engaged by the associated booster battery contact when the latter is moved by said cam to break the said series connection and to apply booster battery to the said busying wire.

10. A telephone system according to claim 9 in which the contact of each of said pairs of normally closed contacts which is engaged by said cam-operated contact is multipled to the contacts of the start control relays which are individual to similar trunks.

11. In a telephone system, trunks for extending a calling line to called lines located in different tariff zones, automatic switches controlled from the calling line for seizing one of said trunks, a controller for developing booster battery metering impulses said controller being common to said trunks, a motor for driving said controller, said controller being normally at rest in a stand-by position, a start circuit for said motor having a start relay which is common to all said trunks and another start relay which is individual to each trunk, means responsive to the seizure of a trunk to close the circuit of said individual start relay and of said common start relay, means responsive to the operation of said motor to provide an operating circuit for said common start relay which is independent of any of said individual start relays, a cam wheel driven from said motor in synchronism with said controller, a contact set controlled by said cam wheel having a pair of normally closed contacts in series between the windings of said common start relay and the individual start relays of the trunks, said cam wheel also having a portion which is effective immediately after closure of said common start relay circuit to maintain said common start relay energized during a cycle of operation of said controller, a locking circuit for said individual start relay, said cam wheel having another portion which is effective just prior to the completion of the cycle of operation of said controller to break said locking circuit and thereby to terminate the metering impulse cycle of said controller.

12. A telephone system according to claim 11 in which another rotatable cam is provided and has associated therewith a pair of normally closed contacts which control said locking circuit, and means to rotate said other rotatable cam to open said set of contacts at recurrent intervals to enable said controller to repeat its metering cycle during the existence of a conversational connection between the calling and called lines.

13. A telephone system according to claim 11 in which said locking circuit is completed through the normally closed contacts of a release relay and a pair of normally closed timing contacts, circuits being provided for operating said release relay when said controller has completed a cycle of metering impulses, and a motive power circuit for said other rotatable cam which is closed by the operation of said release relay.

14. In a telephone system, a calling line, a plurality of called lines having different tariff rates, a call meter for said calling line, automatic means for extending a connection from said calling line to a desired called line of said plurality, a common rotatable metering impulser operative to develop a plurality of sets of metering impulses, each of said sets being characteristic of a particular tariff rate for connections between said calling line and a called line, said automatic means including a plurality of impulse repeaters for repeating impulses to respective called lines of said plurality, each of said impulse repeaters being adapted to be connected to said common impulser to receive a different set of metering impulses therefrom, means for starting said impulser upon the extension of a conversational connection between asid calling line and a particular called line, and means for automatically stopping the rotation of said impulser after a predetermined set of metering impulses have been transmitted by said common impulser to said call meter.

15. In a telephone system, a calling line, a plurality of called lines having different tariff rates, a call meter connected to said calling line, automatic means for extending a connection from said calling line to a desired called line of said plurality, means common to all of said called lines including a motor-driven switching device operative to produce a plurality of sets of metering impulses for transmission to said call meter, each of said sets of metering impulses corresponding in number to a particular tariff zone in which a called line is located, said automatic means including a plurality of impulse repeaters selectively connectible to respective of said called lines, each of said impulse repeaters being adapted to be connected to said common impulser to receive a different set of metering impulses therefrom, means operative upon the extension of a conversational connection from said calling line to a particular called line to actuate said impulse producing means and means to automatically stop said motor-driven device when a predetermined set of metering impulses have been transmitted.

HENRY L. HORWITZ.

REFERENCES CITED

The following references are of record in the file of this patent:

UNITED STATES PATENTS

| Number | Name | Date |
|---|---|---|
| 1,550,666 | Bates et al. | Aug. 25, 1925 |
| 1,575,604 | Powell | Mar. 2, 1926 |
| 1,650,410 | Bellamy | Nov. 22, 1927 |
| 1,859,924 | Johnson et al. | May 24, 1932 |
| 2,073,756 | Osten-Sacken | Mar. 16, 1937 |
| 2,099,616 | Muck et al. | Nov. 1, 1937 |